(12) United States Patent
Crompton

(10) Patent No.: US 7,942,161 B2
(45) Date of Patent: May 17, 2011

(54) PUSH-FIT VALVE WITH INTEGRATED MOUNTING ASSEMBLY

(75) Inventor: David B. Crompton, Tiverton, RI (US)

(73) Assignee: Quick Fitting, Inc., East Providence, RI (US)

( * ) Notice: Subject to any disclaimer, the term of this patent is extended or adjusted under 35 U.S.C. 154(b) by 470 days.

(21) Appl. No.: 12/205,719

(22) Filed: Sep. 5, 2008

(65) Prior Publication Data

US 2009/0057601 A1    Mar. 5, 2009

Related U.S. Application Data

(60) Provisional application No. 60/967,446, filed on Sep. 5, 2007.

(51) Int. Cl.
*F16K 27/00* (2006.01)
(52) U.S. Cl. ............... 137/359; 137/316; 137/315.13
(58) Field of Classification Search ............... 137/316, 137/559, 360, 315.01, 315.12, 315.13
See application file for complete search history.

(56) References Cited

U.S. PATENT DOCUMENTS

| 5,577,530 | A  | * | 11/1996 | Condon  | 137/360 |
| 5,983,917 | A  | * | 11/1999 | Thomas  | 137/316 |
| 7,509,971 | B2 | * | 3/2009  | Kajuch  | 137/359 |
| 7,862,089 | B2 | * | 1/2011  | Crompton | 285/340 |

* cited by examiner

*Primary Examiner* — Kevin L Lee
(74) *Attorney, Agent, or Firm* — Williams Mullen, PC; Thomas F. Bergert

(57) ABSTRACT

The present invention provides an integrated valve, push connection and push release components, and a valve mounting assembly for use on fluid, air or gas applications. The invention allows for the installation of the valve by sliding the valve over the supply tube/piping or pushing the tube/piping into the valve. Once connected, an o-ring seals the connection, a packing gland applies energy to the o-ring seal maintaining constant, even pressure across the seal, and a grip ring applies opposing energy to prevent the disconnection of the assembly. The quick connection assembly is retained by a retaining cap, which applies constant, positive force on the sealing surface.

2 Claims, 2 Drawing Sheets

PUSH-FIT VALVE WITH INTEGRATED MOUNTING ASSEMBLY

REFERENCE TO RELATED APPLICATIONS

This application claims the benefit of U.S. provisional patent application Ser. No. 60/967,446, filed Sep. 5, 2007 and entitled "Push to Connect Valve, With Integrated Mounting Assembly, Quick Connection Mounting and Quick Dismounting" the disclosure of which is incorporated herein by reference.

FIELD OF THE INVENTION

The present invention relates to fluid flow systems, and more particularly to a push-fit valve and integrated mounting assembly that facilitates a push connection and push release of fluid flow valve components while also facilitating repair and re-use of piping system parts.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride) and PEX (cross-linked polyethylene).

The conventional method for installing a fluid flow valve incorporates the use of fluid supply piping or tubing which protrudes from the wall, often referred to as rough plumbing. The rough plumbing is mounted to backing inside the wall structure, which supports the tubing. A compression or soldered valve is then installed, creating a fluid supply stop. When using PEX or plastic type tubing, the rough plumbing also incorporates the use of a stub-out solid tube that transitions from the plastic tubing to the stub-out, then connecting to the valve.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick connection fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection and creating a positive seal. Accordingly, no wrenches, clamping, gluing or soldering is involved. Push-fit and/or quick-connect technology for piping systems can be obtained, for example, through Titan Supply Company of Tiverton, R.I., USA, suppliers of the CoPro® line of pipe fittings and related products.

Past pipe fittings and connection methods do not allow quick mounting and dismounting directly from the fluid supply tubing, nor do they allow for piping assemblies that can be easily removed, repaired and reused. In some cases, this is because they are factory sealed, for example. In other cases, it is because the separation of the fitting from the pipe can damage or induce wear on the parts. For example, some push-fit pipe fittings provide permanently fixed demounting rings for removing the fittings. The demounting rings can be depressed axially to lift the fastening ring teeth off of the surface of the inserted pipe, such that the pipe can then be withdrawn. This arrangement can subject the pipe fittings to tampering and shorter life, however. In addition, while fastening ring devices work effectively as an opposing retaining, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, PEX or stainless steel, or any other combination of unlike materials. Past methods further invariably require the replacement of fittings and valves, and do not allow re-use of the fittings or valves in instances where only a small internal component needs to be repaired or replaced.

SUMMARY OF THE PRESENT INVENTION

The present invention provides, in part, a push-fit valve and integrated mounting assembly that facilitates the connection, mounting, dismounting, repair and re-use of piping system parts. The present invention can be employed with residential and commercial plumbing in bathroom, kitchens, laboratories and other areas incorporating fluid handling. The present invention eliminates the requirement for in-wall preparation or stub-out mounting by providing a complete push connect valve assembly that is mounted directly to the supply tubing, and then mounted to the wall utilizing mounting of lag screws. Unlike the conventional methods, the mounted assembly can be easily removed, repaired and reused.

The present invention provides an integrated valve, push connection and push release components, and a valve mounting assembly for use on fluid, air or gas applications. The invention allows for the installation of the valve by sliding the valve over the supply tube/piping or pushing the tube/piping into the valve. Once connected, an o-ring seals the connection, a packing gland applies energy to the o-ring seal maintaining constant, even pressure across the seal, and a grip ring applies opposing energy to prevent the disconnection of the assembly. The quick connection assembly is retained by a retaining cap, which applies constant, positive force on the sealing surface. A leak-free seal is created in seconds without any glue, soldering, compression, welding or tools. Once connected, the user may mount the assembly to a wall or surface utilizing the integrated valve mounting plate and mounting screws. To dismount the assembly, the user can remove the mounting screws, grip the dismounting plate and apply force toward the valve. The dismounting plate applies force to the grip ring, removing its grip from the supply tube or pipe. The user then pulls the valve from the supply while holding the pressure on the dismounting plate. The assembly is reusable and/or repairable by removing the threaded retaining cap to expose the sealing mechanism. The final installation can include an escutcheon or wall plate to dress the final assembly. This escutcheon can optionally be integrated into the final assembly of the valve.

In one aspect, the present invention utilizes a push-to-connect feature on a valve as an integrated assembly. A user can push the stainless steel, copper, CPVC or PEX pipe or tubing into the valve for an instant, permanent connection.

In another aspect, the present invention comprises a dismountable valve that is easily removed and reused by removing the wall mounting screws, then depressing the mounting plate to relieve the grip of the internal grip ring.

In another aspect, the present invention comprises a valve assembly with an integrated mounting plate, which allows for the connection and mounting of the valve to any type of tubing, hose or piping material including, but not limited to Copper, CPVC, Stainless Steel and PEX tubing or hose.

In another aspect, the present invention comprises a mounting assembly, which eliminates the requirement for solid tubing stub mounts, plumbing brackets, or plumbing mount preparation within a wall structure. This feature allows for easy mounting in new or retrofit into existing plumbing or piping applications.

In another aspect, the present invention comprises a valve assembly, which includes a quick connection device, quick release and an optional mounting assembly.

In another aspect, the present invention comprises an integrated or optional wall plate/escutcheon.

In another aspect, the present invention comprises a design or process for the removal of a valve, bracket and mounting assembly utilizing force either created manually or by using a dismounting tool.

DETAILED DESCRIPTION OF THE PREFERRED EMBODIMENTS

Figure 1:
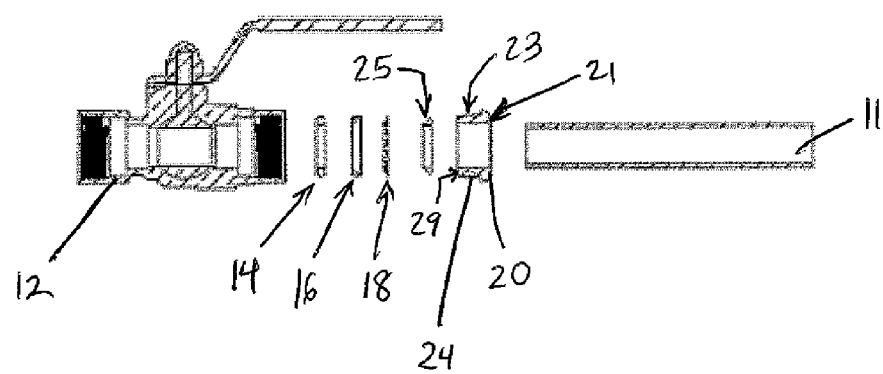
FIG. 1 is an exploded front cross-sectional view of a sample implementation of the valve and valve inner components of the present invention.
Figure 2:
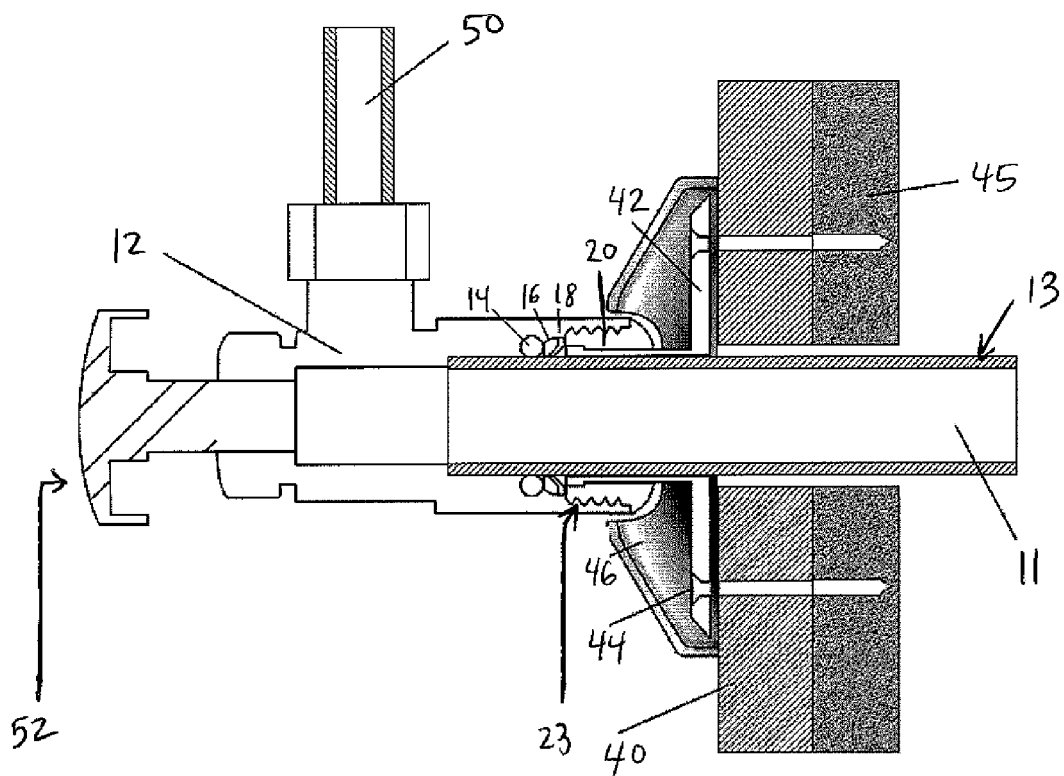
FIGS. 2 and 3 are front cross-sectional views of different embodiments of valve and assembly packages as provided in accordance with the present invention.
Figure 3:
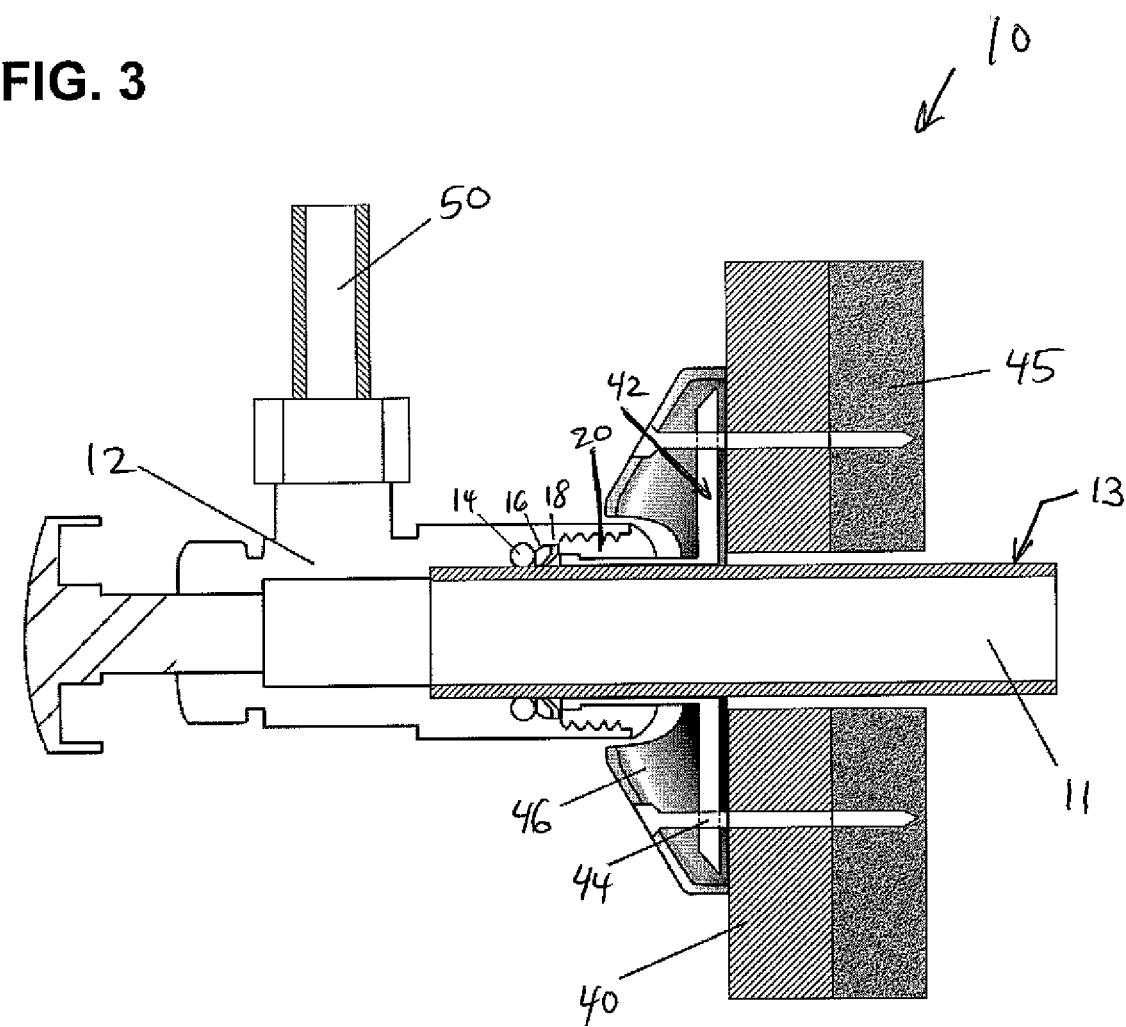

In the push-fit piping assembly 10 of the present invention as shown in FIGS. 1 through 3, elements of the assembly as shown include: a valve body 12 with interior threads, a male packing gland 16, a fastening or grip ring 18, an O-ring member 14 (which can be optionally lubricated) and a retaining cap 20 (also referred to as a gland nut or packing nut) with exterior threads 23 to mate with the threads on the valve body interior 12. The packing gland 16, fastening ring 18 and O-ring member 14 together provide one embodiment of a packing arrangement for the present invention, and each has an internal diameter that allows for smooth and snug engagement of a pipe 11 and/or fluid supply tubing element external surface 13. A separate pipe 50 is shown extending perpendicularly from pipe 11 in FIGS. 2 and 3. In one embodiment of the present invention, the interior diameter of the packing gland, fastening ring and O-ring member are substantially the same as the interior diameter of the end cap body member portion 24. The end cap body member portion 24 is substantially cylindrical and includes the threads 23 on the exterior surface as well as a contact edge 29 at the pipe or valve fitting mating end thereof.

As shown in FIG. 1, the present invention can further include a washer member 25 between the cap 20 and the fastening ring 18. In one embodiment of the present invention, the washer member 25 is a split ring washer having a gap to facilitate physical adjustments involved in positioning the washer member around the pipe for assembly and removal.

In one embodiment of the present invention, the valve body 12 can be forged CW617N brass, for example. The packing gland 16 can be made of a polyamide material, and the lubricant for the O-ring 14 can be a food grade lubricant, for example. It will be appreciated that the O-ring can comprise a flat ring or washer-type seal member in addition or as an alternative to a circular member of substantially circular cross-section. The fastening or grip ring 18 can be stainless steel, and the fastening ring is capable of grabbing the pipe's surface via two or more teeth 19 to ensure connections cannot be pulled apart. The fastening ring teeth are angled downward from the perimeter of the ring, toward the fitting and away from the cap, such that when the pipe is inserted, the teeth exert a pressure against the pipe to discourage the pipe from slipping or moving back out of the fitting. The male packing gland quickly and easily creates a sealing surface. No wrenches, solder, welding, glue and/or twisting and turning the elements are required to form a connection. The threaded retaining cap 20 includes a top cap portion 21 that, when screwed into the fitting body, provides a positive pressure against the male packing gland 16, which in turn provides sealing energy to the O-ring seal 14. The threaded retaining cap affords a more rigid connection than plastic type fittings and can be removed to disassemble the fitting. Further details regarding the elements 12, 14, 16, 18, 20 and 25 can be found in Applicant's co-pending U.S. utility patent application Ser. No. 11/807,086, which is hereby incorporated by reference in its entirety.

In one embodiment of the present invention, as shown in FIGS. 1 through 3, the end cap 20 is a removable threaded gland nut mounted on the pipe. As the gland nut is threaded into the fitting or valve, even pressure is applied at the cap edge 29 to the sealing or packing arrangement assembly, creating mechanical force on the O-ring to compress the O-ring evenly. Once compressed, the O-ring increases its sealing surface along the tubing/pipe member, thereby increasing the amount of pressure exerted by the O-ring to the sealed surface. The packing gland supports the fastening ring 18 and has an opposing surface that applies even pressure across the surface of the ring gasket or O-ring member 18.

Once the above components are connected, the user can mount the assembly to a wall 40 or surface utilizing the integrated valve mounting plate 42 and mounting screws 44. As shown in FIGS. 2 and 3, the screws 44 can extend through wall 40 into a further support member 45. To dismount the assembly, the user can remove the mounting screws 44, grip the dismounting plate 42 and apply force toward the valve 12, such as at end 52. The dismounting plate 42 applies force to the grip ring 18, removing its grip from the supply tube or pipe. The user then pulls the valve 12 from the supply tube or pipe while holding the pressure on the dismounting plate 42. The assembly is reusable and/or repairable by removing the threaded retaining cap 20 to expose the sealing mechanism. In one embodiment of the present invention, the final installation can include an escutcheon 46 or wall plate to dress the final assembly. This escutcheon 46 can optionally be integrated into the final assembly of the valve. In the embodiment of the invention as shown in FIG. 2, the escutcheon 46 is separated with the dismounting plate 42. In the embodiment of the invention as shown in FIG. 3, the escutcheon 46 is integrated with the dismounting plate 42.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A push-fit valve with integrated mounting assembly, comprising:
   a fastening assembly, comprising:
      an o-ring member;
      a packing gland;
      a grip ring;
      and an end retaining cap member, the o-ring member, packing gland member, grip ring, and end retaining cap member adapted to fit snugly over a fluid supply pipe or tube member;
   a valve body member adapted to receive the fastening assembly; and
   a dismounting plate adapted to be mounted to a structural surface and further adapted to receive the valve body member such that, when a force is exerted on the valve body member and a counter force is exerted on the dismounting plate, the grip ring is released from its snug fit on the fluid supply pipe.

2. The valve with assembly of claim 1, further including an escutcheon plate secured around the dismounting plate.

* * * * *